(12) United States Patent
McKnight (10) Patent No.: US 8,087,499 B1
(45) Date of Patent: Jan. 3, 2012

(54) VIBRATION WAVE CONTROLLED VARIABLE STIFFNESS STRUCTURES AND METHOD OF MAKING SAME

(75) Inventor: Geoffrey P. McKnight, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1186 days.

(21) Appl. No.: 11/825,295

(22) Filed: Jul. 6, 2007

(51) Int. Cl.
*F16D 57/00* (2006.01)
(52) U.S. Cl. .................................................. 188/266
(58) Field of Classification Search ............. 310/323.02, 310/323.12, 324, 323.19; 188/378, 267, 188/266.7
See application file for complete search history.

(56) References Cited

U.S. PATENT DOCUMENTS

| | | | |
|---|---|---|---|
| 5,833,038 A * | 11/1998 | Sheiba ........................ | 188/378 |
| 6,000,660 A | 12/1999 | Griffin et al. | |
| 6,301,752 B1 | 10/2001 | Kota | |
| 6,469,419 B2 * | 10/2002 | Kato et al. ............... | 310/323.02 |
| 6,984,920 B2 * | 1/2006 | Yoon et al. ............... | 310/323.12 |
| 7,296,654 B1 * | 11/2007 | Berman ........................ | 181/207 |
| 7,595,580 B2 * | 9/2009 | Heim ............................ | 310/324 |
| 2003/0102411 A1 | 6/2003 | Kota | |
| 2003/0235460 A1 | 12/2003 | Moon et al. | |

OTHER PUBLICATIONS

Douglas Campbell and Arup Maji, Deployment Precision and Mechanics of Elastic Memory Composites, Apr. 7-10, 2003, Norfolk, Virginia, AIAA 2003-1495; pp. 6-7.

Melek Yalcintas and Heming Dai, Magnetorheological and electrorheological materials in adaptive structures and their performance comparison, Smart Mater.Struct.8, (1999), 560-573.

Melek Yalcintas and John P. Coulter, Electrorheological material based non-homogeneous adaptive beams, Smart Mater. Struct. 7 (1998), 128-143.

Erik Abrahamson, Mark Lake, Naseem Munshi, Ken Gall, Shape Memory Polymers for Elastic Memory Composites, 43rd Structures, Structural Dynamics, and Materials Conference, Apr. 22-25, 2002, Denver, Colorado, AIAA 2002-1562; pp. 1-11.

David Cadogan, Stephen Scarborough, John Lin, Geogre Sapna, III, Shape Memory Composite Development for Use in Gossamer Space Inflatable Structures, 43rd AIAA/ASME/ASCE/AHS/ASC Structures, Structural, Dynamics, and Materials Conference, Apr. 22-25, 2002, Denver, Colorado, 2002-1372; pp. 1-11.

Will Francis, Mark Lake, Kaushik Mallick, Gregg Freebury, Arup Maji, Development and Testing of a Hinge/Actuator Inforporating Elastic Memory Composites, 44th Structures, Structural Dynamics, and Materials Conference, Apr. 7-10, 2003, Virginia AIAA 2003-1496; pp. 1-14.

Mark Lake, Fred Beavers, The Fundamentals of Designing Deployable Structures with Elastic Memory Composites, 43rd Structures, Structural Dynamics, and Materials Conference, Apr. 22-25, 2002, Denver Colorado, AIAA 2002-1454; pp. 1-10, 12-13.

(Continued)

*Primary Examiner* — Melanie Torres Williams
(74) *Attorney, Agent, or Firm* — George R. Rapacki; Daniel R. Allemeier (57) ABSTRACT

In some embodiments, a variable stiffness structure is provided having a plurality of constant stiffness members. The plurality of constant stiffness members are movably adhered together through a friction force generated by a normal force. Vibration generators are operatively coupled to the plurality of constant stiffness members. The vibration generators can vibrate at a plurality of frequencies. The friction is responsive to the plurality of frequencies whereby providing a change in stiffness of the variable stiffness structure. The variable stiffness structure may have different shapes, for example, beam, rod, plate, or cylindrical. The vibration generators may be ultrasonic resonators in some embodiments.

38 Claims, 8 Drawing Sheets

OTHER PUBLICATIONS

Mark Lake, Naseem Munshi, Michael Tupper, Troy Meink, Application of Elastic Memory Composite Materials to Deployable Space Structures, AIAA Space 2001 Conference and Exposition, Aug. 28-30, 2001, New Mexico, AIAA 2001-4602; pp. 1-10.

C. Liang, C.A. Rogers, E. Malafeew, Investigation of Shape Memory Polymers and Their Hybrid Composites, Journal of Intelligent Material Systems and Structures, vol. 8 Apr. 1997, 380-386.

* cited by examiner

VIBRATION WAVE CONTROLLED VARIABLE STIFFNESS STRUCTURES AND METHOD OF MAKING SAME

CROSS-REFERENCE

The present application is related to co-pending and commonly assigned patent application entitled "Variable Stiffness Materials," Ser. No. 11/193,148 filed Jul. 29, 2005, which claims the benefit of Provisional Application No. 60/601,300 filed Aug. 13, 2004. The content of these related applications are incorporated herein by reference in its entirety.

FIELD OF THE INVENTION

The present invention relates to variable stiffness components and materials which may be rapidly changed in stiffness, in particular, by use of vibration wave control.

BACKGROUND

The field of adaptive structures has evolved the integration of actuation and sensing elements into structures so that the response of the system to external stimuli may be altered. Current state of the art generally involves attaching an "active material" component to a structural member composed of a linear elastic material such as aluminum or polymer matrix fiber composites. In such an arrangement the active material component can responsively and adaptively actuate the linear elastic material in response to external stimuli.

Active material components are those belonging to a category of materials that change their shape or stiffness in response to an external control field. Some examples include piezoelectric, magnetostrictive, and shape memory alloy materials. Linear elastic materials are those belonging to a category of materials where the strain and stress experienced during deformation are linearly related, and upon relief of stress, all deformation is removed.

While utility may be obtained using active materials incorporated with linear elastic materials, significant change in shape and form of the structural component is hampered by the use of linear elastic materials. These materials present a sub-optimal design choice for the design of large changes in structural shape. In one case, the structural components can be designed such that stiffness and strength are low, but the overall deformation is large. In another approach, the structure may be designed such that the system exhibits high stiffness, but as a result the reversible deformation capability of the structure is limited and large amounts of energy are required to affect a change in the geometry, along with a significant support structure to maintain the deformation. In addition, these materials cannot accomplish significant "Gaussian Curvature" or simultaneous curvature about two orthogonal axes because this requires a change in area in the plane of the deformation. Typical linear elastic materials are severely limited in their capability for changing area.

The capability for structural components to achieve large changes in shape would be greatly enabled by materials that can reversibly change their elastic stiffness. By changing elastic stiffness, the energy required for deformation can be decreased. Further advantages would result from a material, which in a lowered stiffness state could undergo large reversible deformation in at least one direction. Given these properties, it would be possible to consider making large changes in the shape of high-stiffness structural components. While this property is currently available using polymers, especially shape memory polymers, these materials possess low elastic stiffness and thus are generally not preferred for structural components.

Current structure design using static component shapes often requires compromise between various operational conditions rather than optimization over a range of conditions. If an intermittent change in structure is required, for example in the reconfiguring of an aircraft wing from a take-off or landing configuration to a cruising configuration, current solutions require extra components and added complexity is incurred. This problem is not limited to aerospace but is common to a myriad of technologies, such as for example automotive, space, telecommunications, medical, optical, or other technologies where structural or surface reconfiguration is desirable.

Other important areas where a change in stiffness is desirable include storage and deployment of expandable structures. Current methods rely heavily on complicated assemblies of rigid parts that make use of traditional mechanical components (pivots, latches, etc.). Deployable devices using variable stiffness structures would enable new designs to be considered, with fewer parts and assembles, thus reducing weight and complexity.

Other important areas where a change in stiffness is desirable includes impact/crash mitigation and protection from ballistic objects. Current approaches to each of these problems use static stiffness materials to absorb energy from impact of objects or occupants. Generally speaking there are compromises in the design of safety and armor systems due to the static materials properties. Materials which can rapidly change their stiffness and deformation properties can be used to make adaptive energy absorption components. For example, typical uses may include armor and restraint devices for vehicles.

U.S. Pat. No. 6,000,660 by Griffin, et al., herein incorporated by reference, describes a variable stiffness member which changes its stiffness by rotating an elliptical shaft, thereby changing the bending stiffness according to the change in height and width of the elliptical cross section. This concept is limited in the total change in stiffness achievable, and it is not nearly as robust as a material that exhibits intrinsic change in stiffness. In addition, this approach is not applicable to creating stiffness changes or structural shape changes in large planar surface components.

Fibrous elastic memory composite materials utilizing carbon fibers and a shape memory polymer matrix can change their elastic stiffness. Details of this approach are outlined by Campbell and Maji, in the publication "Deployment Precision and Mechanics of Elastic Memory Composites," presented at the 44th Annual AIAA Structure, Structural Dynamics and Materials Conference, Norfolk, Va., Apr. 7-10, 2003. The limitation of these materials comes from the use of fiber as reinforcement agent, which undergo microbuckling in order to achieve high compressive strain. The mechanical properties of the composite material once microbuckling has been initiated are significantly reduced as compared to the initial aligned fiber direction. In addition, the process of microbuckling can be difficult to control in terms of the direction of the microbuckling (i.e., in-plane or out-of-plane). Another important limitation of these materials, in the case of deforming surfaces, is a limitation in the amount of area change (simultaneous strain in two orthogonal directions) that can be achieved due to the inextensibility and length of the reinforcing fibers.

Another approach intended to serve the same role as these materials, in the specific case of morphing structures, are termed compliant structures. Compliant structures employ a specific architecture that tailors deflection along a desired contour when subject to known input forces and deflections. While this approach is advantageous in some applications, it is generally limited in the number of configuration states that can be achieved and optimized. Therefore, it is not as effective when more than one pre-specified range of motion is desired.

In some applications what is needed is a structure capable of changing bending stiffness in response to a control signal such that the stiffness may be decreased, the material reshaped, and the stiffness returned after reshaping. In certain applications, what is needed is a structure that allows a change in material stiffness to permit a change in the shape and function of a structural or surface component. Further, in some applications, what is needed is a structure that exhibits increased axial stiffness. In some applications, what is needed is a structure whose resonant frequencies may be altered by changing the intrinsic structural stiffness. In still other applications, what is needed is a structure that permits single components to serve multiple roles at reduced overall complexity and weight. In yet other applications, what is needed is large reversible change in surface area of structural materials. In yet other applications what is desired is a rapidly tunable mechanical stiffness to tailor response to ballistic and crash events.

SUMMARY

In some embodiments, a variable stiffness structure is provided having a plurality of constant stiffness members. The plurality of constant stiffness members are movably adhered together through a friction force generated by a normal force. Vibration generators are operatively coupled to the plurality of constant stiffness members. The vibration generators can vibrate at a plurality of frequencies. The friction is responsive to the plurality of frequencies whereby providing a change in stiffness of the variable stiffness structure. A method of making same is also disclosed.

In certain embodiments, the variable stiffness structure has a beam shape. The variable stiffness structure comprises one or more tensioner bolts so adapted to provide the normal force holding the constant stiffness members together by the friction force. The vibration generators operatively couples vibration to the tensioner bolts to module the friction force. The constant stiffness members may be a series of plates. The vibration generators may be ultrasonic resonators. A method of making same is also disclosed.

In certain embodiments, the variable stiffness structure is a tensile member having variable tensile strength in at least one direction. The constant stiffness members are substantially translated with respect to one another at least one direction to create an overall structural deformation. The vibration generators are shaped to circumscribe the constant stiffness members together, and generate the normal force and the friction force between the constant stiffness members. Non-limiting example of the vibration generators may be ultrasonic resonators. A method of making same is also disclosed.

In certain embodiments, the constant stiffness members are concentric cylinders. The vibrator generators are so disposed within the constant stiffness members to generate vibration to modulate the friction force between the constant stiffness members. The vibration generators may be ultrasonic resonators. A method of making same is also disclosed.

In certain embodiments, the variable stiffness structure has a substantively planar shape. The constant stiffness members are plate-shaped members with openings to accommodate a plurality of coupling tension elements, whereby the constant stiffness members are movably coupled together by the coupling tension elements. The coupling tension elements also generate the normal force and the friction force. Each coupling tension element comprises a vibration generator, whereby the friction force is modulated by activating and de-activating the vibration generator. The vibration generators may be ultrasonic resonators. A method of making same is also disclosed.

DESCRIPTION OF THE DRAWINGS

The present invention will be better understood and appreciated more fully from the following detailed description taken in conjunction with the drawings described below.

DESCRIPTION

The present invention will now be described more fully hereinafter with reference to the accompanying drawings, in which preferred embodiments of the invention are shown. This invention may be embodied in many different forms and should not be construed as limited to the embodiments set forth herein. Further, the dimensions of layers and other elements shown in the accompanying drawings may be exaggerated to more clearly show details. The present invention should not be construed as being limited to the dimensional relations shown in the drawings, nor should the individual elements shown in the drawings be construed to be limited to the dimensions shown.

The present invention relates to variable stiffness components and materials which may be rapidly changed in stiffness. The present invention operates on a principal of using vibration to modulate the effective stiffness of structural components. In some preferred embodiments, the vibration frequency may be within the ultrasonic range. Exemplary and non-limiting examples of structural components can comprise layers of stiff elements. Non-limiting examples of materials used to create such stiff elements are metallic alloys such as steel, aluminum, titanium, and magnesium and composite materials such as glass or carbon fiber reinforced polymers and similar materials. In some situations, ceramic materials and reinforced ceramic materials may be preferred. Induced vibration modulates the frictional force in between the layers of stiff elements, in order to change the stiffness of the structural components.

Compared to prior art variable stiffness structures, the present invention accomplishes major improvement on the speed of stiffness change. For example, currently shape memory polymer based materials have actuation times on the order of minutes, the present invention can yield variable stiffness materials which activate in the range of milliseconds. Furthermore, while developed with generic deformable materials in mind, the present invention is generic and can potentially yield tunable stiffness structures. Exemplary and non-limiting structures can be beams, rods, and axles which have variable stiffness properties.

Further, the present invention potentially provides the advantages of variable stiffness materials at high transition speeds. Variable stiffness materials provide a new means to create large structural deformations with minimized losses in system weight and complexity. Necessary actuators and power systems can be reduced as compared to a static stiffness material, and better structural performance can be obtained than is possible with current large deformation materials (i.e. rubbers). One current approach to the construction of variable stiffness structures uses relatively mature composite materials based on shape memory polymers, which are inherently slow and power intensive. The present invention can potentially dramatically improve on both of these issues due to the speed of the vibration induction (less than 0.001 s) and low power requirements because of use of surface rather than volume effects.

Figure 1:
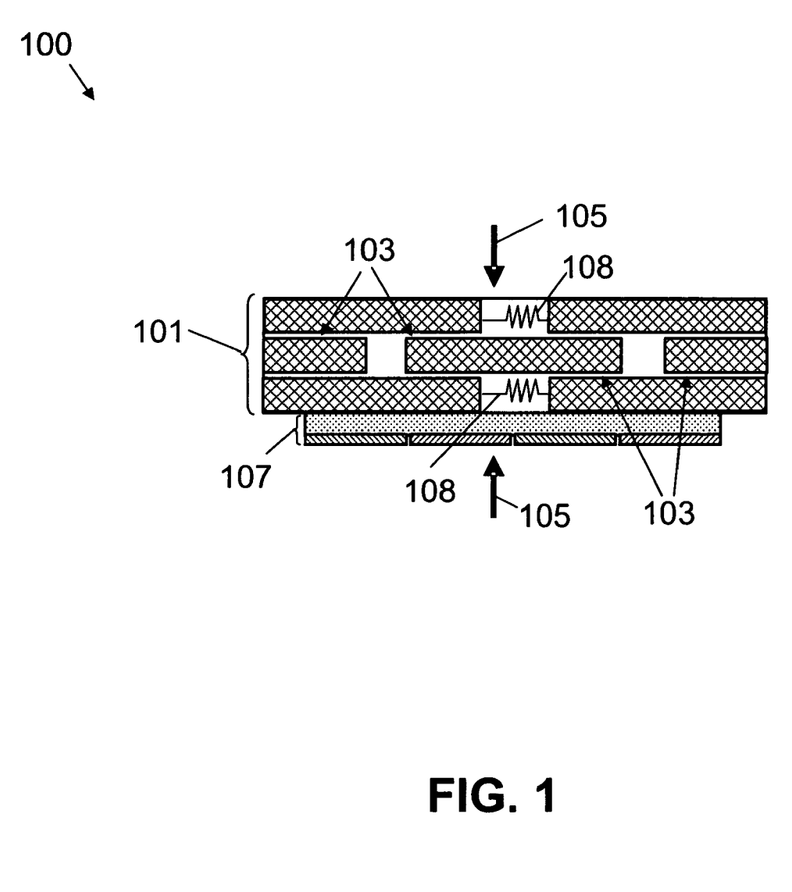
FIG. 1 is a cross sectional view of a simplified illustration of a vibration wave controlled variable stiffness structure in accordance with an embodiment of the present invention.

FIG. 1 is a simplified illustration of a vibration wave controlled variable stiffness structure 100 in accordance with an embodiment of the present invention. In some embodiments, the vibration wave may be within the ultrasonic range. In this illustration, a stack of stiff plates 101 are adhered together through friction 103 generated by a normal force 105. Further included in this structure 100 is a vibration generator 107. Non-limiting example of a vibration generator may be an ultrasonic resonator so adapted to generate a standing wave in a higher order bending (2-8th) mode. The structure 100 utilizes the concept of an ultrasonic motor except that a traveling wave is not generated. By applying a field (e.g. electric voltage) to cause the vibration generator 107 to vibrate at an appropriate frequency, a motion is produced by the vibration generator 107 to provide a change in the local normal force 105 and friction 103 coefficients sufficient to lower the energy necessary to slip the stiff plates 101 with respect to one another.

One or more optional energy storage elements 108 may be used to store energy during deformation that may be later used to help reset the variable stiffness structure 100 to the original configuration. Non-limiting examples of these elements can be traditional springs such as leaf or coils, or blocks of materials with relatively large reversible elastic strain such as polymers and elastomers. In general the plates themselves are not deformed, but rather slide in position with respect to one another. This general concept can be employed in many ways as will be discussed in the subsequent sections by using a number of non-limiting exemplary embodiments.

Embodiments of the Variable Stiffness Structure

Figure 2:
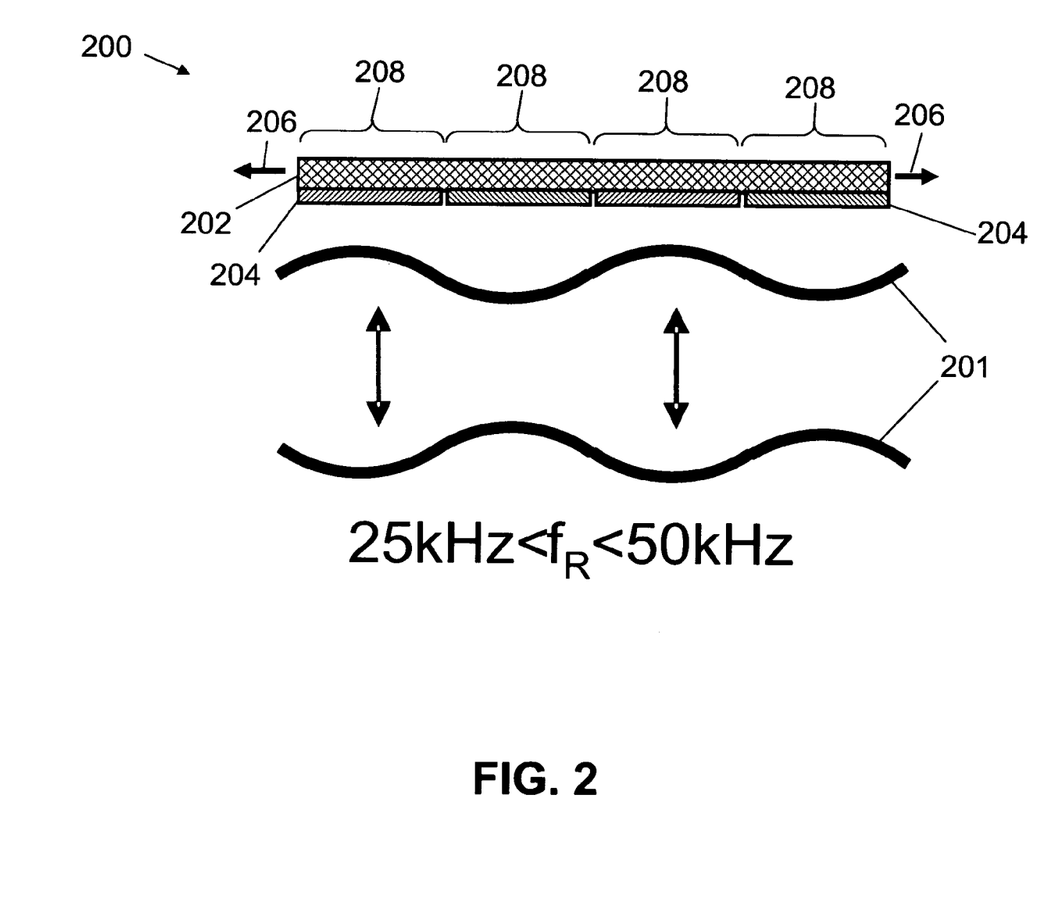
FIG. 2 is a cross sectional view of a vibration generating device.

FIG. 2 is a cross sectional view of an exemplary vibration generator 200 in the form of an ultrasonic resonator device setup to produce a higher order standing wave in bending. This example is meant to describe the general principles involved in creating standing elastic waves 201 and not meant to describe a preferred geometry for the present invention. Generally, an elastic member 202 is affixed with piezoelectric patches 204 oriented (alternating polarization orientation) such that the d31 effect induces axial strain 206 in the elastic member. By alternating these patches 204, a series of expansion and contraction zones 208 in the elastic member 202 are created, thereby inducing an out-of-plane bending deformation. To provide the greatest performance the activation frequency and strain orientation of the patches 204 should be designed to coincide with the intrinsic bending mode of the elastic member 202. Alternative to piezoelectric patches 204 may be ferroelectric, electrostrictive, magnetostrictive, and ferromagnetic shape memory alloy. To those skilled in the art this is well known. However, the integration of these elements in accordance with the present invention with a laminated type structure to provide widely varying stiffness and deformation properties in not obvious in light of the prior art.

Figure 3A:
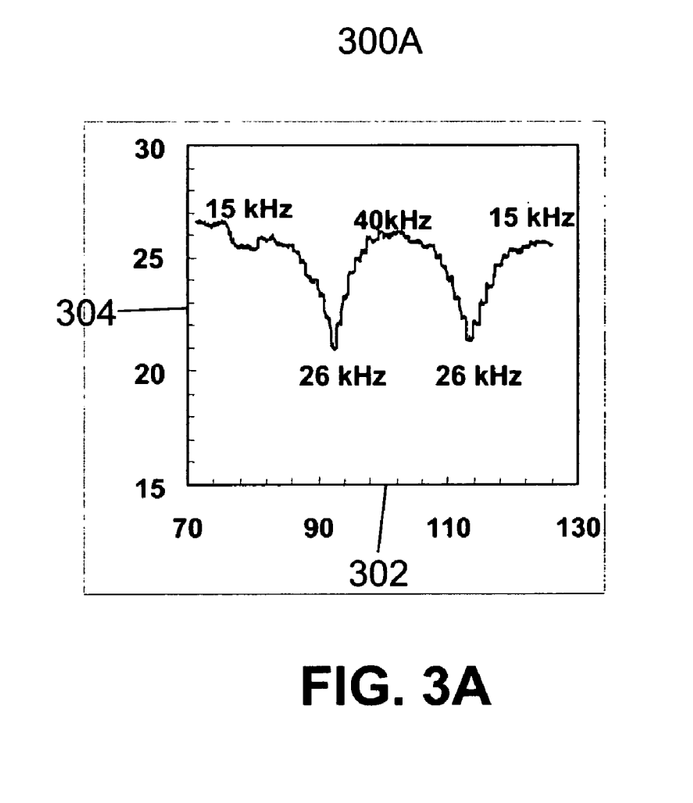
FIG. 3A is a chart illustrating the measured changes in shear yield stress deformation for a vibration wave controlled variable stiffness structure as a function of excitation frequency in accordance with an embodiment of the present invention.

FIG. 3A is a graph 300A illustrating a non-optimized result of changes in shear yield stress for an exemplary ultrasonic resonator attached to a set of axial sliding plates similar to the structure 100 shown in FIG. 1. The X-axis 302 shows time unit in seconds. The Y-axis 304 shows shear stress unit in kPa. As can be observed from the graph, changes of 25% are shown when the driving frequency is matched to the device resonance frequency; in this non-limiting example the resonance frequency is about 26 KHz as indicated on graph 300A. By altering various parameters in the design such as the frictional surface coefficients, texturing of the surface, and increased normal force and actuation strain, the yield stress and change in yield stress may be further optimized.

Figure 3B:
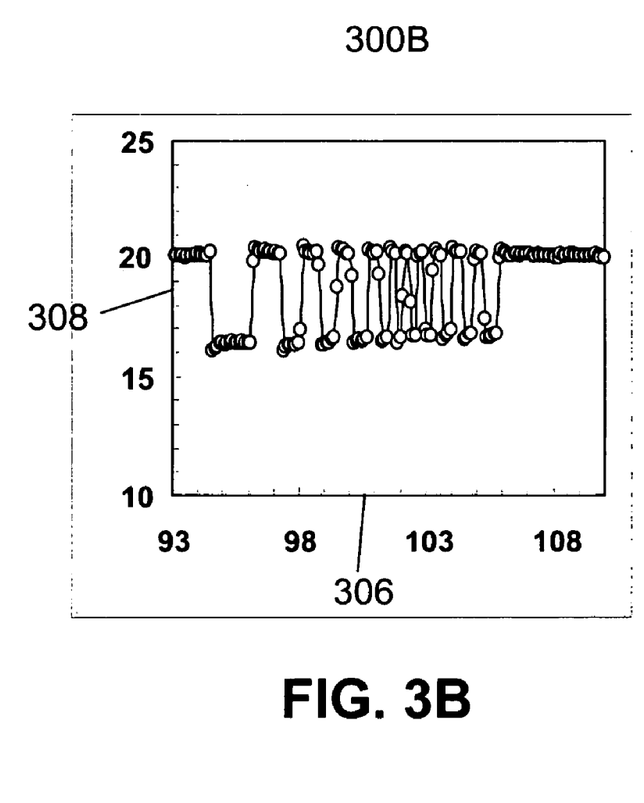
FIG. 3B is a chart illustrating a vibration wave controlled variable stiffness structure switched between two states as a function of time in accordance with an embodiment of the present invention.

FIG. 3B is a graph 300B illustrating the rapid activation and de-activation of this same structure 100 (shown in FIG. 1) as a function of time. The X-axis 306 shows time unit in second. The Y-axis 304 shows shear stress unit in kPa. Activation times of less than 1 ms are theoretically possible. While these data (FIGS. 3A and 3B) demonstrate the generic concept involved in the present invention, many potential embodiments are possible and will be described in the following sections.

Figure 4:
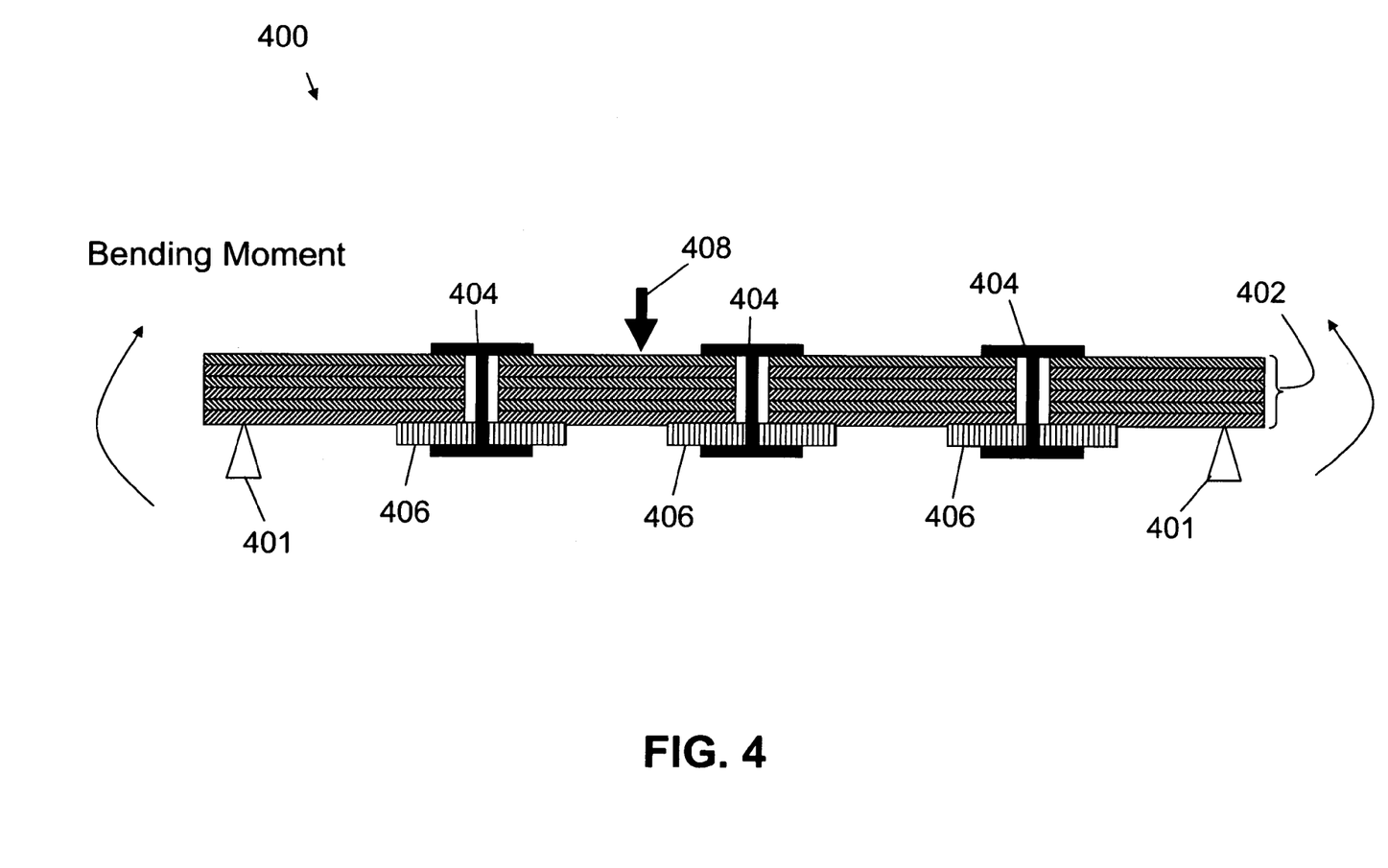
FIG. 4 is a cross sectional view of a simplified illustration of a vibration wave controlled variable stiffness structure in accordance with an embodiment of the present invention.

In one exemplary embodiment, a beam implementation 400 of the present invention is shown in FIG. 4 resting on its supports 401. The structural support is carried by a series of plates 402 stacked on top of one another with attention paid to the surface quality and coatings on these plates 402 so that the friction between these plates 402 is well controlled. The frictional normal force is applied via tensioner bolts 404 applied along the length of the laminate plates 402. The tensioner bolts may be augmented. Inside each tensioner bolt 404 load path is a vibration generator 406 such as an ultrasonic resonator which allows control of the frictional load between the plates 402. The plates 402 may have slots cut (not shown) in them such that a large deformation may be permitted. This beam implementation 400 will allow a variable response to a bending load 408 by varying the coupling between the plates 402 through varying their friction to one another modulated by the vibration wave induced by the vibration generator 406. By increasing the friction between the plates 402, the stiffness of the beam 400 is increased and vice versa. By using a stack of plates, the change in bending stiffness can be.

Figures 5A, 5B, 5C:
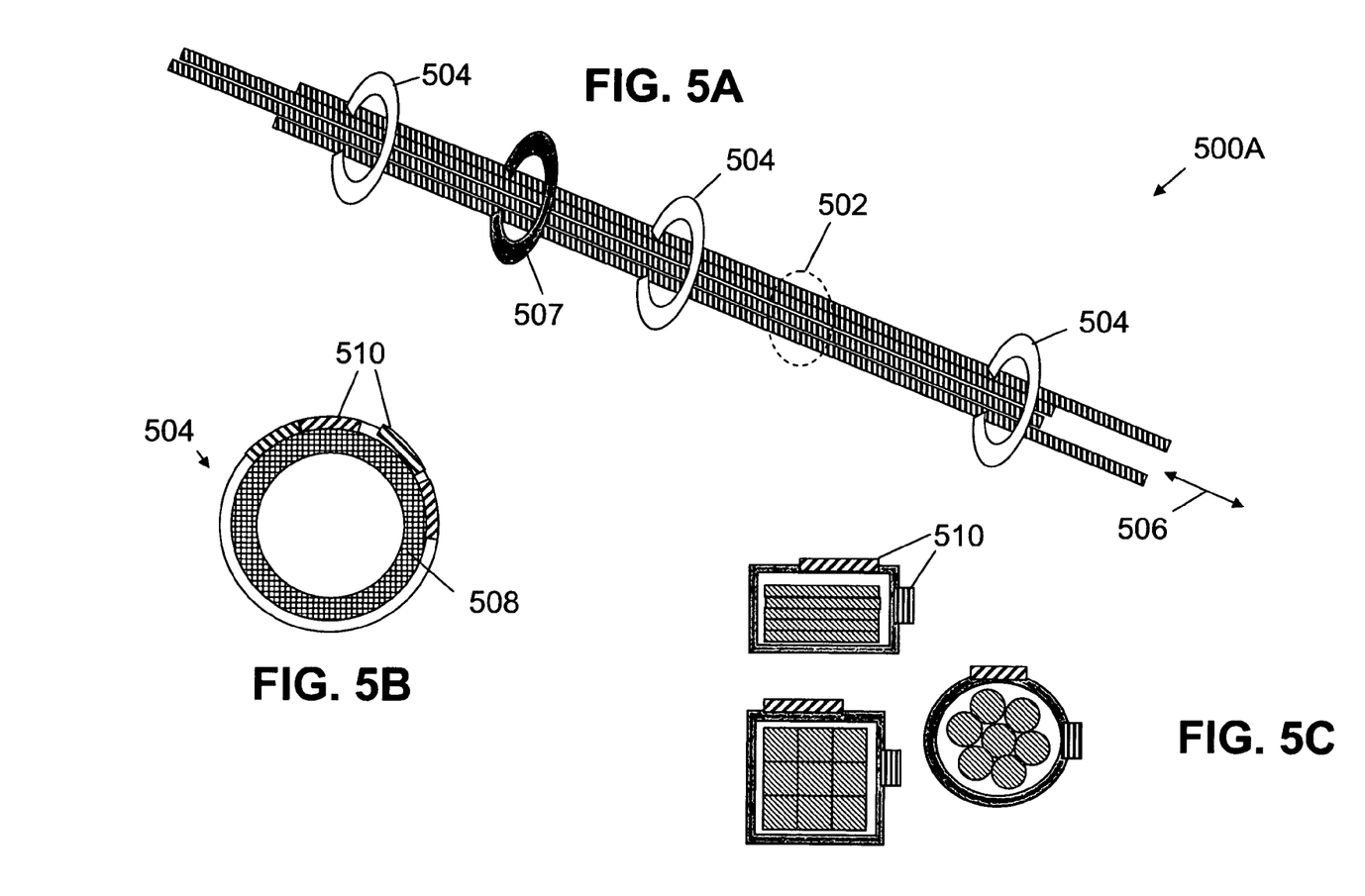
FIG. 5A is a perspective view of a simplified illustration of a vibration wave controlled variable stiffness structure in accordance with an embodiment of the present invention.
FIG. 5B are a cross sectional view of a simplified illustration of a ring-shaped vibration generator in accordance with an embodiment of the present invention.
FIG. 5C is a cross sectional view of alternative embodiments of the present invention shown in FIG. 5A.

In another embodiment, FIGS. 5A and 5B show a concept device 500A for a tensile structural member employing the vibration wave controlled variable stiffness concept in accordance to the present invention. In this device 500A, tensile members 502 are bound together with vibrators 504 which provide both frictional normal force and variable friction loading between the members 502. This exemplary embodiment allows variable deformation force in the axial direction 506. In this embodiment, the vibrators 504 can be a ring-shaped vibrator. This embodiment may be used in traditional tension elements such as tensioning cables or suspension members for a macroscopic implementation. This embodiment may also be used in small scale implementation, similar to fibers in fabrics, to build up larger, more complicated variable stiffness structures. Optionally, an elastic element 507 may be fitted to the assembly to store energy during deformation, and provide a return path to original state.

Referring to FIG. 5C, it shows a few alternative embodiments for both the vibrators 504 shown in FIGS. 5A and 5B, and the constant stiffness elements (502 in FIG. 5A). The vibrators can take the shape of square or rectangle. The constant stiffness elements can also take various forms other than cylindrical such as plates and sheets which may be used to alter the frictional properties and mechanical behavior of the assembly.

FIG. 5B illustrates one possible implementation of the vibrator 504 in accordance to the present invention. It comprises a ring-shaped elastic element 508 and a plurality of vibration elements 510. By alternating the polarization of these piezoelectric vibration elements 510, a series of expansion and contraction zones (not shown) in the elastic member 508 are created, thereby inducing an hoop-type deformation pattern. To provide the greatest performance the vibration elements 510 should be so designed to coincide with one intrinsic hoop vibration mode of the elastic member 508. To those skilled in the art this is well known.

Figure 6:
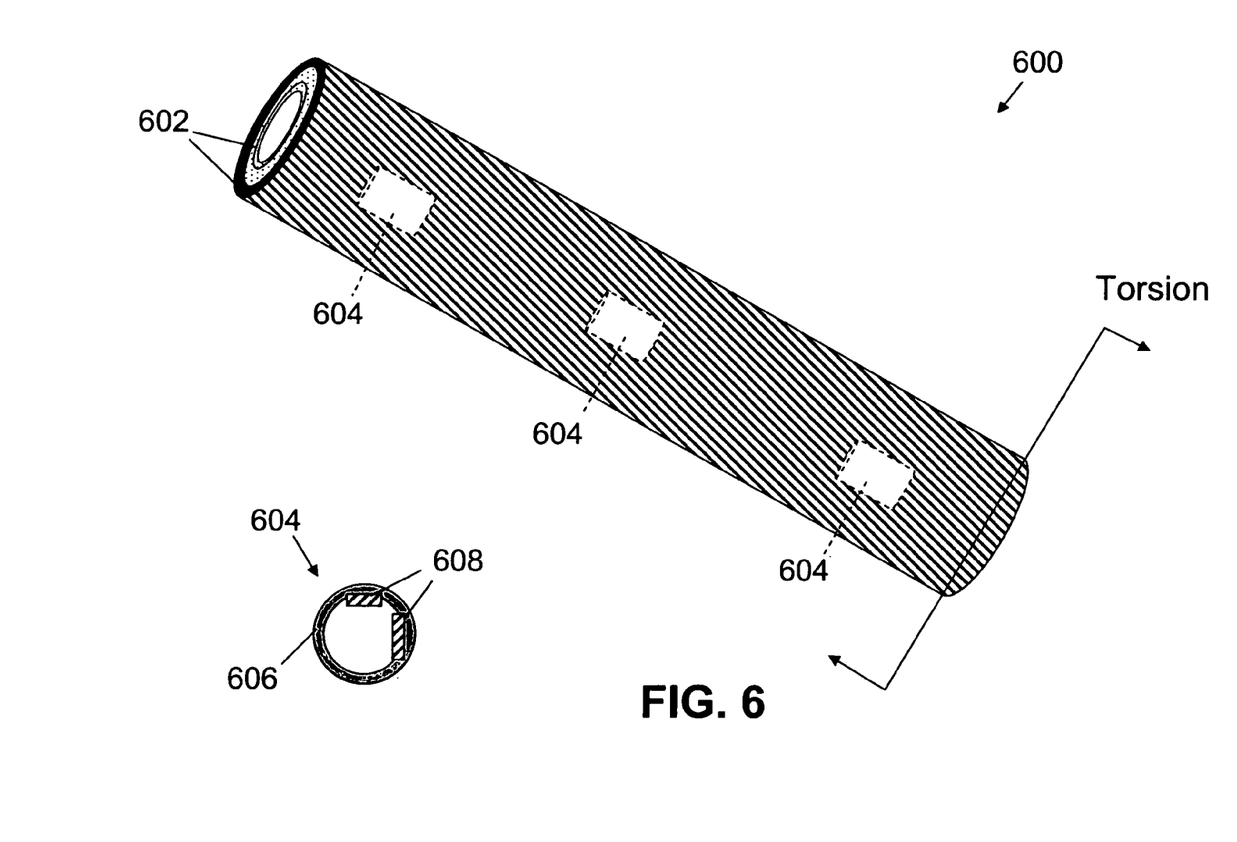
FIG. 6 is a perspective view of a simplified illustration of a vibration wave controlled variable stiffness structure in accordance with an embodiment of the present invention.

In yet another embodiment, FIG. 6 illustrates a vibration wave controlled variable torsional stiffness member 600 in accordance to the present invention. This particular embodiment can be used for members that carry axial loads such as axles and shafts. The member 600 comprises concentric cylinders 602 arranged such that frictional force binds the angular displacement of the members. One end of the shaft (member 600) is connected to one set of alternating cylinders 602 and the other to the other set. Vibration generators 604 such as ultrasonic resonators (operating in hoop/barrel deformation modes) are placed within the core of the shaft and activate variable friction coupling between the cylinders 602 when actuated. Each vibration generator 604 comprises an elastic element 606 and one or more active vibration members 608.

This embodiment 600 can be useful to provide shafts which can couple two elements strongly and then be relaxed to provide deformation between the two. While clutches can achieve a similar function, this embodiment 600 is potentially much lighter in weight. Furthermore, a series of these variable torsional stiffness members 600 may be used to provide variable coupling to elements along a shaft thus proving greater actuation points from a single motor and saving system weight and complexity.

Figure 7A:
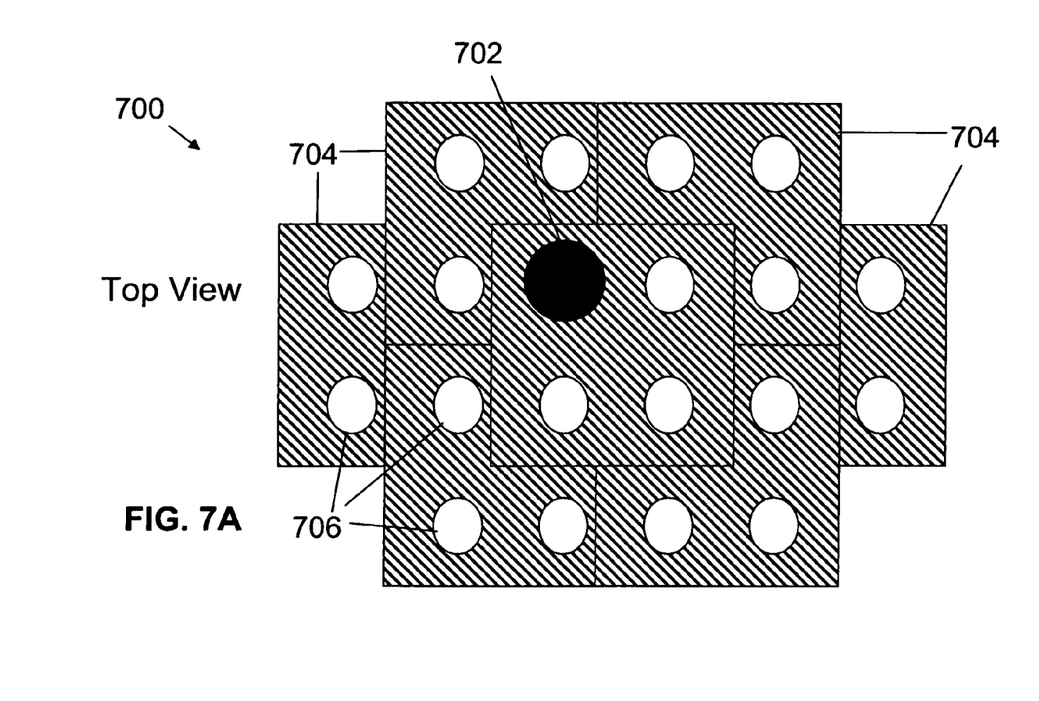
FIGS. 7A and 7B show a top view and a cross sectional view of a simplified illustration of a vibration wave controlled variable stiffness structure in accordance with an embodiment of the present invention.
Figure 7B:
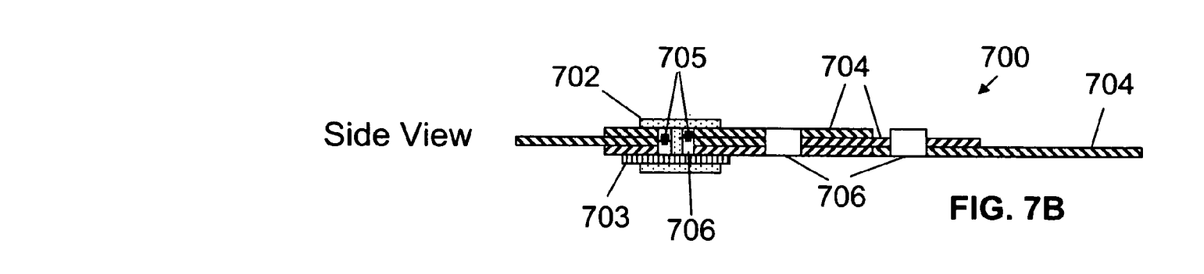

In yet another embodiment, FIGS. 7A and 7B illustrate a simplified drawing of a plate-shaped variable stiffness structure 700 comprising vibration induced variable coupling tension elements 702. Each tension element 702 can comprise a vibration generator 703 such as an ultrasonic resonator shown in FIG. 7B. The plate-shaped variable stiffness structure 700 comprises a plurality of thin plates 704 such as laminates with openings 706 cut to accommodate the variable coupling tension elements 702. By activating and de-activating the tension elements 702, the coupling force between the plate laminates 704 may be modulated to provide varying degrees of stiffness in the surface of the plate-shaped variable stiffness structure 700. Many different geometries for the plate laminates 704 may be considered. Non-limiting examples include square, hexagonal, circular, octagonal, etc. The tension elements 702 preferably further comprise a spring element 705 to provide constant normal force during activation of the vibration generator 703. This structure 700 can be used to generate altering shape surfaces by applying actuation to the boundaries and changing the stiffness as required. Both in-plane and out of plane deformation are permitted using this structure.

By using the variable friction approach at a component level, numerous applications are possible. For example, telescoping parts that employ variable friction interfaces can be made much more rigid and lightweight than is possible with current telescoping parts. One application of telescoping parts is for use in variable geometry aircraft wings and control surfaces. Furthermore, variable stiffness structure can be use as part of automotive control aero surfaces to increase downforce on vehicle wheels, or reduce drag using deployable panels. Yet another possible application is construction of expandable or deployable structures.

Figure 8A:
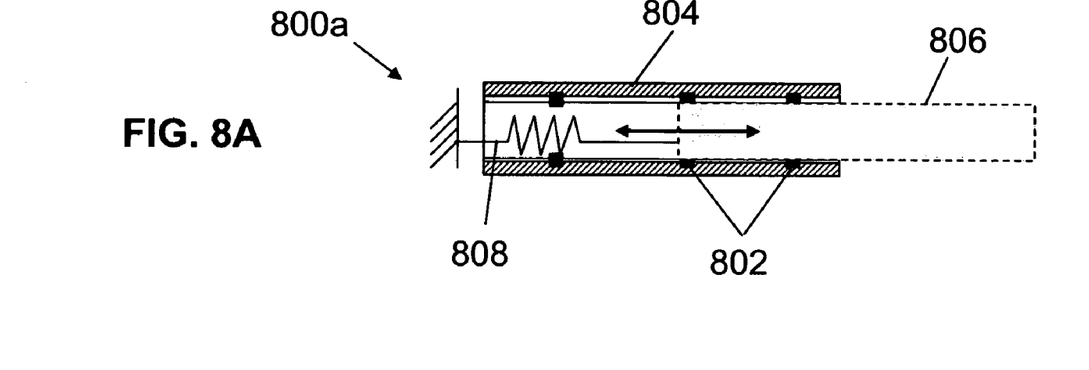
FIGS. 8A and 8B are cross sectional view of simplified illustrations of vibration wave controlled telescoping variable stiffness structure in accordance with an embodiment of the present invention.
Figure 8B:
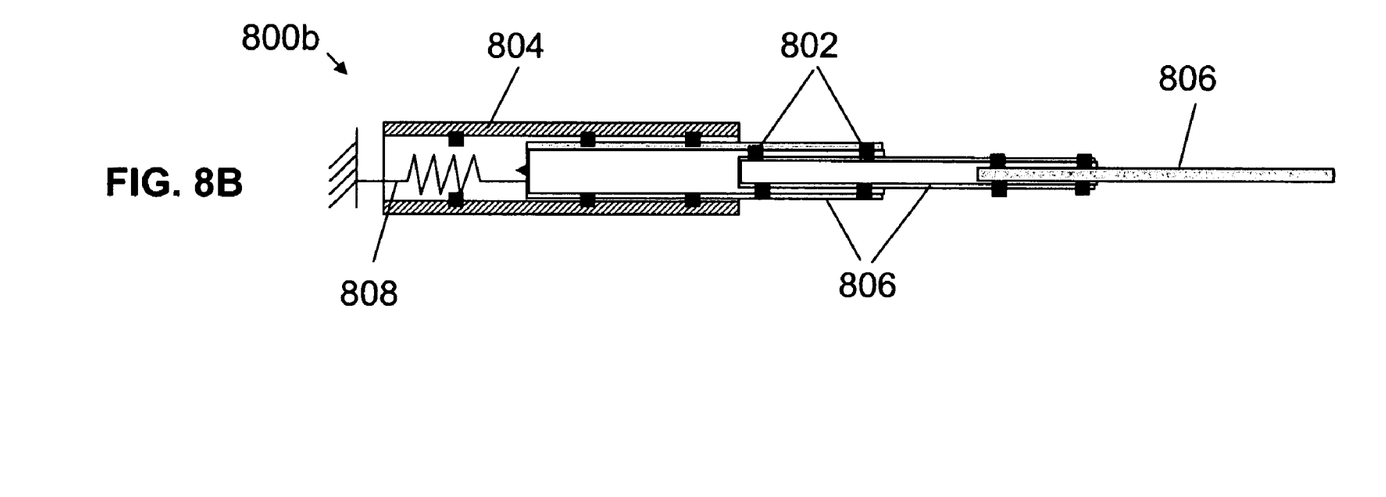

FIGS. 8A and 8B illustrate two examples of telescoping variable stiffness structures 800a, 800b. By controlling the vibration elements 802, the friction between non-moving sections 804 and the telescoping sections 806 can be modulated, whereby the shape of these telescoping variable stiffness structures can be altered relatively easy when the friction between non-moving sections 804 and telescoping sections 806 are reduced by inducing a suitable vibration to the structures 800a 800b through the vibration elements 802. Optional elastic elements 808 can be fitted to assist the variable stiffness structure to return to its previous shape. In general an actuator or motor would be used to extend and contract the assembly, though in certain embodiments body forces, such as centripetal force in a rotating blade, can be used to effect the extension of the telescoping parts. The cross sectional shape of these telescoping parts can be one of the form of rectangular, square, oval, circular, as well as arbitrary shapes with concave and convex portions. By selecting the cross section, it is possible to achieve various degrees of bending and torsional rigidity in the telescoping parts as required in a particular application. One key advantage of this approach over existing mechanical approaches is that there are no detents required to establish a locked position and thus any arbitrary state may be achieved rather than a small number of discrete positions.

Furthermore, the frictional force and durability of the frictional surfaces of the various elements in the variable stiffness structures can be engineered in various manners. These include texturing the surfaces into various patterns which increase friction or the use of specialized coating with alter friction coefficient between the surfaces. In addition specialized polymeric or ceramic based coatings may increase the durability of the frictional surfaces to increase device lifetime and reliability.

Although the present invention has been described in considerable detail with reference to certain preferred versions thereof, other versions are possible. Therefore, the spirit and scope of the appended claims should not be limited to the description of the preferred versions contained herein.

What is claimed is:

1. A variable stiffness structure comprising:
   a plurality of constant stiffness members, the plurality of constant stiffness members movably adhering together through a friction force generated by a normal force; the variable stiffness structure having a shear yield stress and
   one or more vibration generators operatively coupled to the plurality of constant stiffness members, the vibration generators having an energized state and a de-energized state; the shear yield stress having a first value when the vibration generators are in the de-energized state and a second value when the vibration generators are in the energized state; wherein the first value is greater than the second value;
   wherein the vibration generators vibrate at a plurality of frequencies when in an energized state.

2. The variable stiffness structure as set forth in claim 1 wherein the variable stiffness structure has a substantially beam-shape form.

3. The variable stiffness structure as set forth in claim 2 further comprising one or more tensioner bolts so adapted to provide the normal force holding the constant stiffness members together by the friction force; the vibration generators operatively coupling vibration to the tensioner bolts to modulate the friction force.

4. The variable stiffness structure as set forth in claim 3 wherein the stiffness members are a series of plates.

5. The variable stiffness structure as set forth in claim 4 wherein the vibration generators are ultrasonic resonators.

6. The variable stiffness structure as set forth in claim 1 wherein the variable stiffness structure is a tensile member having variable tensile strength in at least one direction.

7. The variable stiffness structure as set forth in claim 6 wherein the constant stiffness members are substantially translated with respect to one another in the at least one direction.

8. The variable stiffness structure as set forth in claim 7 wherein the vibration generators are shaped to circumscribe the constant stiffness members together, and generate the normal force and the friction force between the constant stiffness members.

9. The variable stiffness structure as set forth in claim 8 wherein the vibration generators are ultrasonic resonators.

10. The variable stiffness structure as set forth in claim 1 wherein the constant stiffness members are concentric cylinders.

11. The variable stiffness structure as set forth in claim 10 wherein the vibrator generators are so disposed within the constant stiffness members to generate vibration to modulate the friction force between the constant stiffness members.

12. The variable stiffness structure as set forth in claim 11 wherein the vibration generators are ultrasonic resonators.

13. The variable stiffness structure as set forth in claim 1 wherein the variable stiffness structure has a substantively planar shape.

14. The variable stiffness structure as set forth in claim 13 wherein the constant stiffness members are plate-shaped members with openings to accommodate a plurality of coupling tension elements, whereby the constant stiffness members are coupled together by the coupling tension elements, the coupling tension elements generating the normal force and the friction force.

15. The variable stiffness structure as set forth in claim 14 wherein each coupling tension element comprises the vibration generator, whereby the friction force is modulated by activating and de-activating the vibration generator.

16. The variable stiffness structure as set forth in claim 15 wherein the vibration generators are ultrasonic resonators.

17. The variable stiffness structure as set forth in claim 1 wherein the constant stiffness members form a telescoping structure.

18. The variable stiffness structure as set forth in claim 17 wherein the vibrator generators are so disposed to generate vibration to modulate the friction force between the constant stiffness members.

19. The variable stiffness structure as set forth in claim 18 wherein the vibration generators are ultrasonic resonators.

20. A method of constructing a variable stiffness structure comprising:
    providing a plurality of constant stiffness members, the plurality of constant stiffness members movably adhering together through a friction force generated by a normal force; the variable stiffness structure having a shear yield stress and
    providing one or more vibration generators operatively coupled to the plurality of constant stiffness members, the vibration generators having an energized state and a de-energized state;
    the shear yield stress having a first value when the vibration generators are in the de-energized state and a second value when the vibration generators are in the energized state;
    wherein the first value is greater than the second value;
    wherein the vibration generators vibrate at a plurality of frequencies when in an energized state.

21. The method as set forth in claim 20 wherein the variable stiffness structure has a substantially beam-shape form.

22. The method as set forth in claim 21 further comprising: providing one or more tensioner bolts so adapted to provide the normal force holding the constant stiffness members together by the friction force; the vibration generators operatively coupling vibration to the tensioner bolts to module the friction force.

23. The method as set forth in claim 22 wherein the stiffness members are a series of plates.

24. The method as set forth in claim 23 wherein the vibration generators are ultrasonic resonators.

25. The method as set forth in claim 20 wherein the variable stiffness structure is a tensile member having variable tensile strength in at least one direction.

26. The method as set forth in claim 25 wherein the constant stiffness members are substantially translated with respect to one another in the at least one direction.

27. The method as set forth in claim 26 wherein the vibration generators are shaped to circumscribe the constant stiffness members together, and generate the normal force and the friction force between the constant stiffness members.

28. The method as set forth in claim 27 wherein the vibration generators are ultrasonic resonators.

29. The method as set forth in claim 20 wherein the constant stiffness members are concentric cylinders.

30. The method as set forth in claim 29 wherein the vibrator generators are so disposed within the constant stiffness members to generate vibration to modulate the friction force between the constant stiffness members.

31. The method as set forth in claim 30 wherein the vibration generators are ultrasonic resonators.

32. The method as set forth in claim 20 wherein the variable stiffness structure has a substantively plate shape.

33. The method as set forth in claim 32 wherein the constant stiffness members are plate-shaped members with openings to accommodate a plurality of coupling tension elements, whereby the constant stiffness members are coupled together by the coupling tension elements, the coupling tension elements generating the normal force and the friction force.

34. The method as set forth in claim 33 wherein each coupling tension element comprises the vibration generator, whereby the friction force is modulated by activating and de-activating the vibration generator.

35. The method as set forth in claim 34 wherein the vibration generators are ultrasonic resonators.

36. The method as set forth in claim 20 wherein the constant stiffness members form a telescoping structure.

37. The method as set forth in claim 36 wherein the vibrator generators are so disposed to generate vibration to modulate the friction force between the constant stiffness members.

38. The method as set forth in claim 37 wherein the vibration generators are ultrasonic resonators.

* * * * *